(12) United States Patent (10) Patent No.: US 12,681,456 B2
Eklund et al. (45) Date of Patent: Jul. 14, 2026

(54) ARRANGEMENT AND A COMPUTER-IMPLEMENTED METHOD FOR THREE-DIMENSIONAL (3D) PRINTING OF AT LEAST ONE VEHICLE COMPONENT FOR A VEHICLE

(71) Applicant: Volvo Truck Corporation, Gothenburg (SE)

(72) Inventors: Bo Linus Eklund, Kullavik (SE); Christian Johansson, Mölndal (SE); Anders Nilsson, Västra Frölunda (SE)

(73) Assignee: Volvo Truck Corporation, Gothenburg (SE)

( * ) Notice: Subject to any disclaimer, the term of this patent is extended or adjusted under 35 U.S.C. 154(b) by 667 days.

(21) Appl. No.: 18/113,127

(22) Filed: Feb. 23, 2023

(65) Prior Publication Data

US 2023/0297070 A1 Sep. 21, 2023

(30) Foreign Application Priority Data

Mar. 15, 2022 (EP) ..................................... 22162336

(51) Int. Cl.
*G05B 19/4099* (2006.01)
(52) U.S. Cl.
CPC .................... *G05B 19/4099* (2013.01); *G05B 2219/49023* (2013.01)
(58) Field of Classification Search
CPC ...... G05B 19/4099; G05B 2219/49023; B33Y 30/00; B33Y 50/00; B33Y 80/00;
(Continued)

(56) References Cited

U.S. PATENT DOCUMENTS

| 10,991,172 B1* | 4/2021 | Oakes, III | .............. | G07C 5/008 |
| 2009/0037049 A1* | 2/2009 | Clodfelter | .............. | A01B 63/00 |
| | | | | 280/727 |

(Continued)

FOREIGN PATENT DOCUMENTS

| CN | 110482026 A | 11/2019 |
| DE | 102010045997 A1 | 11/2011 |

(Continued)

OTHER PUBLICATIONS

Extended European Search Report, EP Application No. 22162336.6, mailed Sep. 29, 2022, 7 pages.

*Primary Examiner* — Kamini S Shah
*Assistant Examiner* — Michael Tang
(74) *Attorney, Agent, or Firm* — Sage Patent Group

(57) ABSTRACT

An arrangement and a computer implemented method for three-dimensional (3D) printing of at least one first vehicle component (first VC) for a vehicle is provided. The method includes receiving a request to form the first VC. The method includes obtaining a 3D model for the first VC. The method includes identifying at least one second vehicle component located in proximity to the first VC when mounted on the vehicle. Also, the method includes determining at least one breaking point of the first VC which avoids the first VC to come into contact with the identified at least one second vehicle component in case the first VC should break at the at least one breaking point. The method includes forming a 3D model for the first VC based on the request and the determined at least one breaking point. The method includes instructing a 3D printer to print the 3D model.

18 Claims, 3 Drawing Sheets

(58) Field of Classification Search
CPC .... B62D 31/02; B62D 33/04; B60Y 2306/01;
B60Y 2410/00
USPC ...................................................... 700/118
See application file for complete search history.

(56) References Cited

U.S. PATENT DOCUMENTS

| | | | | |
|---|---|---|---|---|
| 2015/0048649 A1 * | 2/2015 | Stojkovic | ............. | B62D 21/152 |
| | | | | 296/187.1 |
| 2018/0259939 A1 * | 9/2018 | Garcia | .................. | B29C 64/393 |
| 2022/0144190 A1 * | 5/2022 | Isoda | ................... | H02G 11/006 |

FOREIGN PATENT DOCUMENTS

| | | | | | |
|---|---|---|---|---|---|
| DE | 102013203642 A1 * | 9/2014 | ............. | H04N 23/51 |
| JP | 2010089646 A * | 4/2010 | | |
| WO | WO-2017149215 A1 * | 9/2017 | ............. | B62D 25/16 |
| WO | 2021001022 A1 | 1/2021 | | |
| WO | 2021155933 A1 | 8/2021 | | |
| WO | WO-2021222697 A1 * | 11/2021 | ............. | G06F 30/12 |

* cited by examiner

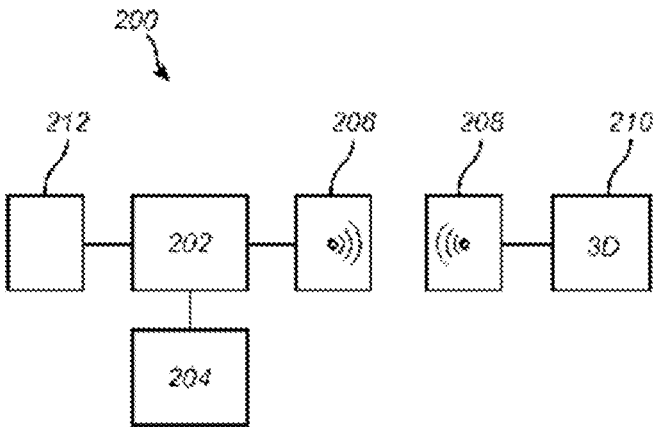
*Fig. 2*
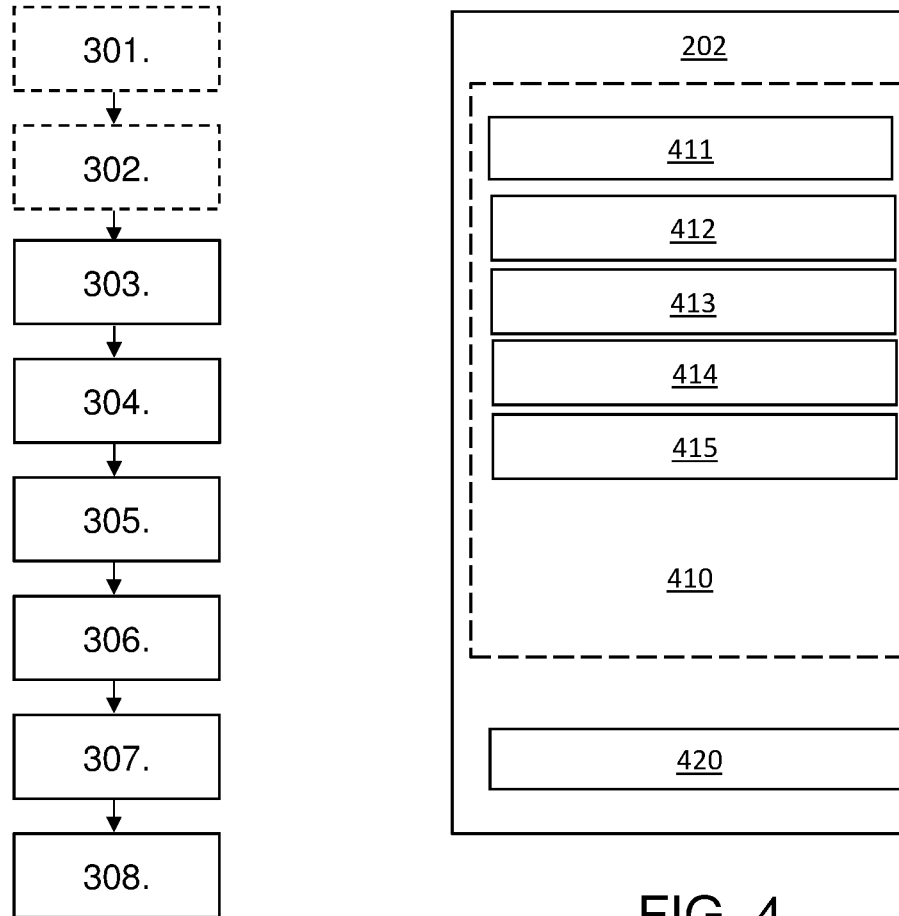
FIG. 3
FIG. 4

ARRANGEMENT AND A COMPUTER-IMPLEMENTED METHOD FOR THREE-DIMENSIONAL (3D) PRINTING OF AT LEAST ONE VEHICLE COMPONENT FOR A VEHICLE

CROSS REFERENCE TO RELATED APPLICATIONS

This application claims priority to European Patent Application No. 22162336.6, filed on Mar. 15, 2022, the disclosures and content of which is incorporated by reference herein in its entirety.

TECHNICAL FIELD

The present disclosure herein relate in general to 3D printing. In particular, embodiments herein relate to an arrangement and computer implemented method for three-dimensional (3D) printing of at least one vehicle component for a vehicle. Further, various aspects relate to a vehicle comprising the arrangement, a computer program product for performing the method and a computer program product carrier.

BACKGROUND

Recently there have been great advances in three-dimensional printing technologies, also known as 3D printing, pushing the boundaries of different types of materials that may be used in 3D printing as well as in relation to improvements in the quality and mechanical strength of objects manufactured using such 3D printing technologies.

3D printing provides a way of quickly producing objects using many different 3D printing technologies, including stereo-lithography, selective laser sintering and fused filament fabrication (FFF), which is also referred to as fused deposition modeling (FDM). Although fabrication of an object using 3D printing is rapid compared to conventional manufacturing techniques such as injection molding, milling or casting, it can still take many hours, depending on the size of the object. Additionally, the maximum size of objects that can be printed may be limited by the printing envelope (or tray size) of the 3D printer.

An example of an improvement in 3D printing is disclosed in US20150057784, where the process of 3D printing is improved by segmenting input jobs and/or combining parts of input jobs together thereby improving utilization of the 3D printer.

Specifically, the method according to US 20150057784 improves throughput and reduces printing latency by providing for dividing jobs into multiple parts that can be printed in parallel on a single 3D printer or on more than one 3D printer, using pre-printed or pre-formed blocks in combination with printed parts to complete a job, combining multiple jobs within a single printing envelope (i.e. within the print tray of a single 3D printer), reorienting object, enabling jobs to be added on the fly (i.e. whilst an existing separate job is being printed), such that different objects may start at different vertical heights above the tray, enabling jobs to be amended or cancelled during printing; enabling jobs to be removed during printing, and enabling printing to start before the entire 3D design of the object has been completed.

When a 3D printed part is to replace an original part manufactured using conventional manufacturing technologies it may be undesirable to print an exact copy of the original part. The 3D printed part may have different mechanical and structural properties compared to the original part. The materials used for 3D printing may exhibit properties making a 3D printed copy mechanically inferior compared to an original part manufactured using conventional manufacturing technologies. This may also make the 3D printed copy more prone to mechanical failure and break.

In addition to the above, from a general perspective it may in some situations be desirable to allow the designer of the 3D printed part to have slightly larger flexibility as compared to when manufacturing the original part. With the above in mind, it would be desirable to provide further enhancements for improving 3D printing of parts for replacing original parts manufactured using conventional manufacturing technologies.

SUMMARY

It is an object of embodiments herein to provide an arrangement and method, along with a computer program product and carrier, for three-dimensional (3D) printing of at least one vehicle component for a vehicle that seeks to mitigate, alleviate, or eliminate all or at least some of the above-discussed drawbacks of presently known solutions.

According to a first aspect of embodiments herein, the object is achieved by a computer implemented method for three-dimensional (3D) printing of at least one vehicle component for a vehicle. The method includes receiving a request to form at least one first vehicle component. The method also includes obtaining a 3D model for the at least one first vehicle component. The method further includes identifying at least one second vehicle component located in proximity to the at least one first vehicle component when mounted on the vehicle. Also, the method includes determining at least one breaking point of the at least one first vehicle component which avoids the at least one first vehicle component to come into contact with the identified at least one second vehicle component in case the at least one first vehicle component should break at the at least one breaking point. Further, the method includes forming a 3D model for the at least one first vehicle component based on the request and the determined at least one breaking point and instructing a 3D printer to print the 3D model.

An original vehicle component may generally be based on extensive mechanical design and optimization for a specific manufacturing method and it may sometimes be unfavourable to 3D print an original vehicle component since it will more prone to mechanical failure and thus likely break or malfunction. One option could be to add material to the component in order to be able to handle the mechanical loads to the component. This may however not always be possible since the 3D space for mounting the vehicle component may be limited. Hence, by printing and mounting a 3D printed vehicle component with a weaker mechanical structure that its original vehicle component counterpart may be necessary. However, other components located in the vicinity of 3D printed vehicle component when mounted on the vehicle may thus be exposed to a higher risk of being damaged by 3D printed vehicle component upon potential failure. By determining suitable breaking points for 3D printed vehicle components for a vehicle and incorporating these suitable breaking points in the 3D models of the components, 3D formed or printed vehicle components may be formed that upon failing will avoid causing damage to other components located in its vicinity when mounted on the vehicle. Hence, an improved method for 3D-printing of a component for a vehicle based on a 3D model of the component is achieved.

In some embodiments, the at least one breaking point of the at least one first vehicle component is dependent on predefined physical boundaries of the identified at least one second vehicle component in a vicinity of an expected mounting position of the at least one first vehicle component. For example, by being aware of the predefined physical boundaries of its surrounding vehicle components, a preferable danger zone or advantageous failure direction for the 3D printed vehicle component may be considered when determining the at least one breaking points. This may also mean that specific 3D space boundaries that is larger than the size of the actual identified at least one second vehicle component may be incorporated to allow for extra safety precautions, etc.

According to some embodiments, the method may further comprise obtaining characteristics of the identified at least one second vehicle component and determining the at least one breaking point based on the obtained characteristics. This means, for example, that information regarding its surrounding vehicle components when mounted on the vehicle may be taken into consideration when determining the at least one breaking points of the at least one first vehicle component. In this case, according to some embodiments, the characteristics of the identified at least one second vehicle component comprise a physical robustness indication for the identified at least one second vehicle component. This means, for example, that information regarding how delicate or sensitive different surrounding components are may be taken into consideration when determining the at least one breaking points of the at least one first vehicle component. Optionally, according to some embodiments, the characteristics of the identified at least one second vehicle component comprise a replacement cost indication for the identified at least one second vehicle component. This means, for example, that information regarding how costly the different surrounding components are, or how costly the different surrounding components are to replace, may be taken into consideration when determining the at least one breaking points of the at least one first vehicle component. For example, an electrical wiring bundle of the vehicle that may be harmed upon failure of the at least one first vehicle component would have a high cost to replace, while a storage box of the vehicle would have a low danger level.

According to another option, the characteristics of the identified at least one second vehicle component may, in some embodiments, comprise a safety assessment indication for the identified at least one second vehicle component. This means, for example, that information regarding how dangerous or serious it would be if the different surrounding components where to be damaged by the failure of the at least one first vehicle component may be taken into consideration when determining the at least one breaking points of the at least one first vehicle component. For example, a gas tank of the vehicle that may be penetrated upon failure of the at least one first vehicle component would have a high danger level, while a storage box of the vehicle would have a low danger level.

In some embodiments, the method may comprise receiving an indication of an undesirable operation of the vehicle and identifying the at least one first vehicle component as relating to the undesirable operation of the vehicle. Based on an indication of an undesirable operation of the vehicle, the processing unit may identify that at least one first vehicle component may be the most likely source for the undesirable operation of the vehicle. The at least one first vehicle component may be worn, partly damaged or failed completely and therefore in need of a replacement vehicle component. For example, the at least one first vehicle component may be an engine component, a suspension component, a driveline component or any other vehicle components. The embodiments presented herein may be advantageous for any vehicle component needed for safe and efficient vehicle operation. The indication of an undesirable operation of the vehicle may be detected using one or a plurality of on-board sensors and received by the processing unit. Such a processing unit may in one embodiment be an electronic control unit (ECU), typically provided as an on-board component of the vehicle. Correspondingly, the sensors may for example include sensors for determining "what is happening within and in a surrounding of the vehicle", for example including at least one of a radar, a LiDAR sensor and/or a camera. Other sensors for measuring speed, vibration, acceleration, inclination, torque, vehicle mass, etc. may be equally used in determining the desired general action plan to be performed by the vehicle.

In some embodiments, the indication is based on information received from sensors comprised in the vehicle. An indication of an undesirable operation of a vehicle may be based on onboard sensor data from a plurality of sensors received by the processing unit over a Controller Area Network (CAN bus) interface. A plurality of sensors may also form part of a separate system for transmitting sensor data through a wired and/or wireless connection to the processing unit. The sensor data may comprise data relating to a vehicle component such as temperature data, vibration data, electrical load data, torque load data, speed sensor data, force data, fluid flow data and/or optical data. More than one sensor may sense data for a single vehicle component, or one sensor may sense data relating to a plurality of vehicle components. The sensor data is received by the processing unit and the processing unit may, based on the data, determine a first indication of an undesirable operation of a vehicle.

In some embodiments, the 3D model is dependent on a specified printing technique for the 3D printer. The 3D model may be formed differently based on the desired or available 3D printer. For instance, a 3D model may be formed using additional reinforcements to account for the structural strength of the material used in the 3D printer. Additionally, the 3D printer may require that the 3D model comprises supports or additional material to reinforce or support the model as it is being 3D printed. The 3D model may also comprise excess material to improve the printing of overhangs. The 3D model may also comprise excess materials allowing for correct tolerances of the part to be produced during a second manufacturing step.

In some embodiments, the 3D model is dependent on a predetermined movement scheme for the 3D printer. Forming the 3D model may account for the predetermined movement scheme of the 3D printer. Such predetermined movement scheme may be a linear movement wherein the printing head moves in one plane before continuing to a subsequently plane. Such a printer may be referred to as a 3-axis 3D printer. Another type of 3D printer may instead use 5-axis to move the print head. A 5-axis 3D printer may print directly onto irregular surfaces and allows for more complex 3D models to be printed and is also not bound to printing layer by layer in a XY-plane as a 3-axis 3D printer.

According to a second aspect of embodiments herein, the object is achieved by an arrangement for three-dimensional (3D) printing of at least one first vehicle component for a vehicle. The arrangement comprising a 3D printer and a processing unit. The processing unit is configured to receive a request to form at least one first vehicle component. The processing unit is also configured to obtain a 3D model for the at least one vehicle component. The processing unit is further configured to identify at least one second vehicle component located in proximity to the at least one first vehicle component when mounted on the vehicle. Also, the processing unit is configured to determine at least one breaking point of the at least one first vehicle component which avoids the at least one first vehicle component to come into contact with the identified at least one second vehicle component in case the at least one first vehicle component should break at the at least one breaking point. Further, the processing unit is configured to form a 3D model for the at least one vehicle component based on the request and the determined at least one breaking point, and instruct a 3D printer to print the 3D model.

According to a third aspect of the embodiments herein, the object is achieved by a computer program product comprising instructions which, when executed in a processing circuitry, cause the processing circuitry to carry out the methods described above. According to a fourth aspect of the embodiments herein, the object is achieved by a carrier containing any of the computer program products described above, wherein the carrier is one of an electronic signal, optical signal, radio signal, or computer-readable storage medium. The computer readable storage medium may be any type of memory device, including one of a removable non-volatile random-access memory, a hard disk drive, a floppy disk, a CD-ROM, a DVD-ROM, a USB memory, an SD memory card, or a similar computer readable medium known in the art.

According to a fifth aspect of the embodiments herein, the object is achieved by a vehicle comprising the arrangement described above. The vehicle may generally be any type of vehicle, such as e.g. one of a bus, a truck, a car, or any form of construction equipment or working machine. The vehicle may furthermore be at least one of a pure electrical vehicle (PEV) and a hybrid electric vehicle (HEV). The vehicle may also be a marine vessel.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 2 is a schematic illustration of an arrangement according to some embodiments;

FIG. 3 is a flowchart illustrating embodiments of a method according to some embodiments;

FIG. 4 is a schematic block diagram of processing unit in an arrangement according to some embodiments.

DETAILED DESCRIPTION

Figures 1A, 1B, 1C:
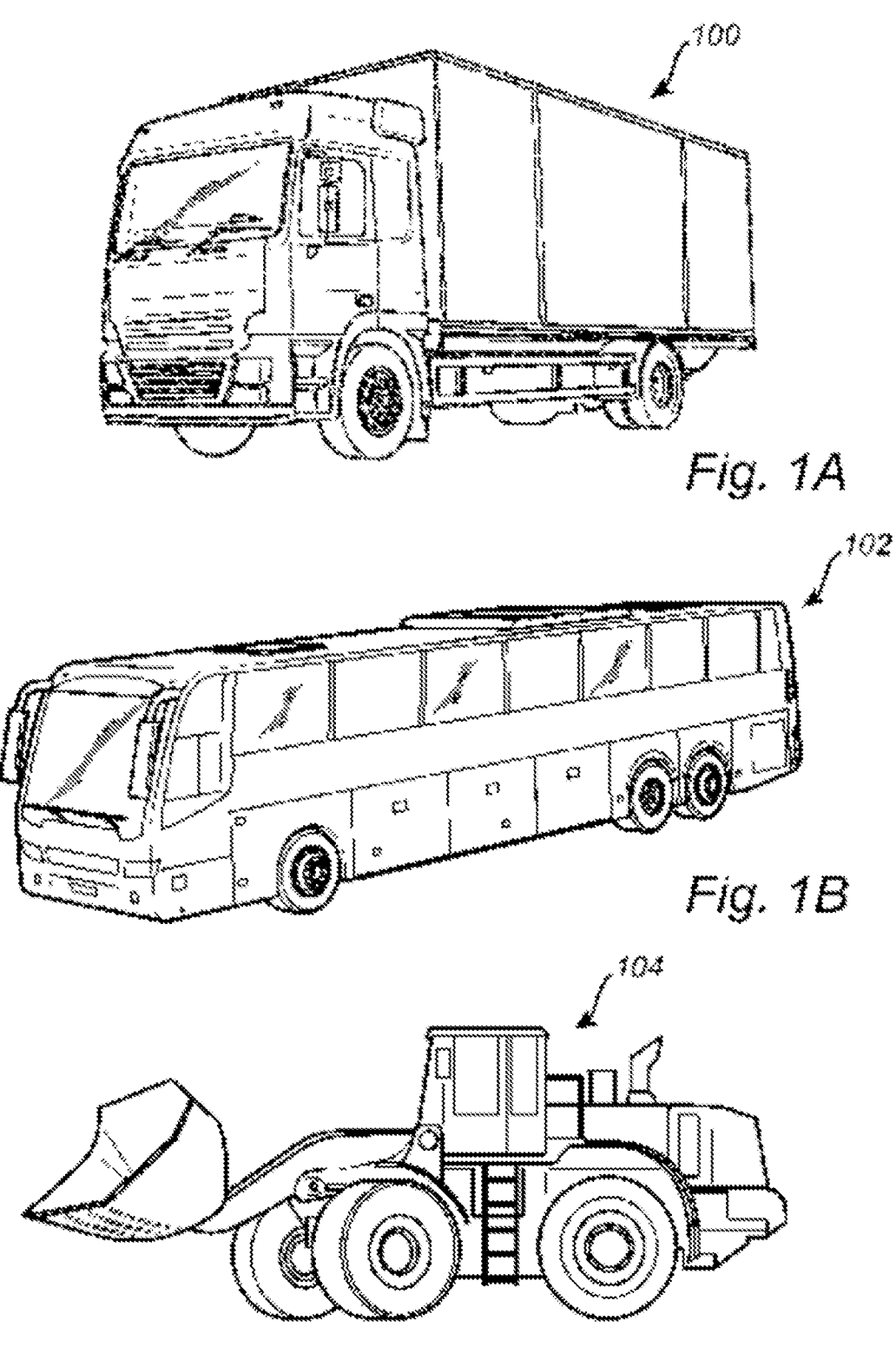
FIGS. 1A-1C illustrate a truck, a bus and wheel loader, respectively, in which the arrangement according to some embodiments may be implemented.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description. It is to be understood that the present invention is not limited to the embodiments described herein and illustrated in the drawings; rather, the skilled person will recognize that many changes and modifications may be made within the scope of the appended claims.

FIGS. 1A-1C illustrates examples of a vehicle 100, 102, 104. In FIG. 1A in particular, there is depicted an exemplary vehicle, here illustrated as a truck 100, in which an arrangement 200, as shown in FIG. 2 below, according to some embodiments herein may be incorporated. The arrangement 200 may of course be implemented, possibly in a slightly different way, in a bus 102 as shown in FIG. 1B or in wheel loader 104 as shown in FIG. 1C, but also in a car or other types of vehicles, such as, marine vessels, etc. In addition to incorporating the arrangement 200 in a vehicle, the arrangement may be arranged off-board the vehicle at e.g., a remote facility, such as possibly a service center. The vehicle 100, 102, 104 may for example be one of an electric or hybrid vehicle, or possibly a gas, gasoline or diesel vehicle. The vehicle 100, 102, 104 comprises an electric machine (in case of being an electric or hybrid vehicle) or an engine (such as an internal combustion engine in case of being a gas, gasoline or diesel vehicle). The vehicle 100, 102, 104 may further be manually operated, fully or semi-autonomous.

FIG. 2 shows a conceptual and exemplary implementation of the arrangement 200, comprising a processing unit 202. In some embodiments, the processing unit 202 may receive data from one or a plurality of sensors 204, such as e.g., vibration sensors, etc., as will be further elaborated below. The processing unit 204 further comprises a first communications unit 206 for communicating wired or wirelessly with the sensor(s) 204. In addition, the communications unit 206 may communicate with a remote processing unit, such as, e.g., a server arranged at a service center (not shown). The arrangement 200 further comprises a 3D printer 210 in communication with the processing unit 202 through a communications interface shown as a second communications unit 208. The 3D printer 210 may be arranged remotely from the processing unit 202, at a manufacturing facility or manufacturing company. Communication between the processing unit 202 and the 3D printer 210 may, for example, be performed using Internet. The processing unit 202 may further be in communication with a server comprising a database 212 of vehicle components including 3D models for said vehicle components. By connecting to the database 212, the processing unit 202 may download or receive (be sent) 3D models for a respective vehicle component.

During operation of the arrangement 200, the processing unit 202 may read data from sensors 204 comprising vehicle and vehicle component data. The data may be analysed by the processing unit 202 in order to determine any undesirable vehicle operation. Alternatively, the data may be communicated wirelessly from the processing unit 202 to an internet connected server (not explicitly illustrated) wherein the data is analysed. The results may be forwarded back to the processing unit 202 and when the processing unit 202 is arranged on-board a vehicle, the results may be displayed to a vehicle operator. The results may also be forwarded to a service centre, wherein an AI/ML, Artificial Intelligence/Machine Learning, algorithm on a computer, or a human service technician, may determine one or a plurality of vehicle components may be faulty and in need of servicing or replacement. The AI/ML algorithm may here be configured with a machine learning model that is trained to determine one or a plurality of vehicle components may be faulty and in need of servicing or replacement based on the data from sensors 204 comprising vehicle and vehicle component data.

The processing unit 202 may receive a request to form at least one first vehicle component. The request may be originated from a vehicle operator, an AI/ML algorithm on a computer or a service technician. The request may comprise information that enables the at least one first vehicle component to be identified through a lookup in a database 212 or the request may comprise a complete 3D model of the first vehicle component including tolerances, possible printing materials and further first vehicle component properties. The 3D printer 210 shown in FIG. 2 may use any known 3D printing technique and may be a Selective Laser Sintering (SLS) printer, Selective Laser Melting (SLM) printer, Electronic Beam Melting (EBM) printer or 3D arc welding printer.

Examples of embodiments of a computer implemented method for three-dimensional, 3D, printing of at least one first vehicle component 430, 430' for a vehicle 100, 102, 104, will now be described with reference to the flowchart depicted in FIG. 3. FIG. 3 is an illustrated example of actions, steps or operations which may be performed by the processing unit 202 in the arrangement 200 described above with reference to FIG. 2. The method may comprise the following actions, steps or operations.

Action 301. Optionally, the processing unit 202 may receive an indication of an undesirable operation of the vehicle 100, 102, 104. Here, according to some embodiments, the indication is based on information received from sensors 204 comprised in the vehicle 100, 102, 104. As indicated above, it may be possible to include a plurality of sensors 204 with the vehicle 100, 102, 104.

Action 302. After receiving the indication in Action 301, the processing unit 202 may optionally also identify the at least one first vehicle component 430, 430' as relating to the undesirable operation of the vehicle 100, 102, 104. This means that the processing unit 202 automatically may determine which vehicle component that is causing the undesirable operation of the vehicle 100, 102, 104.

Figures 5A, 5B, 5C, 5D, 5E, 5F:
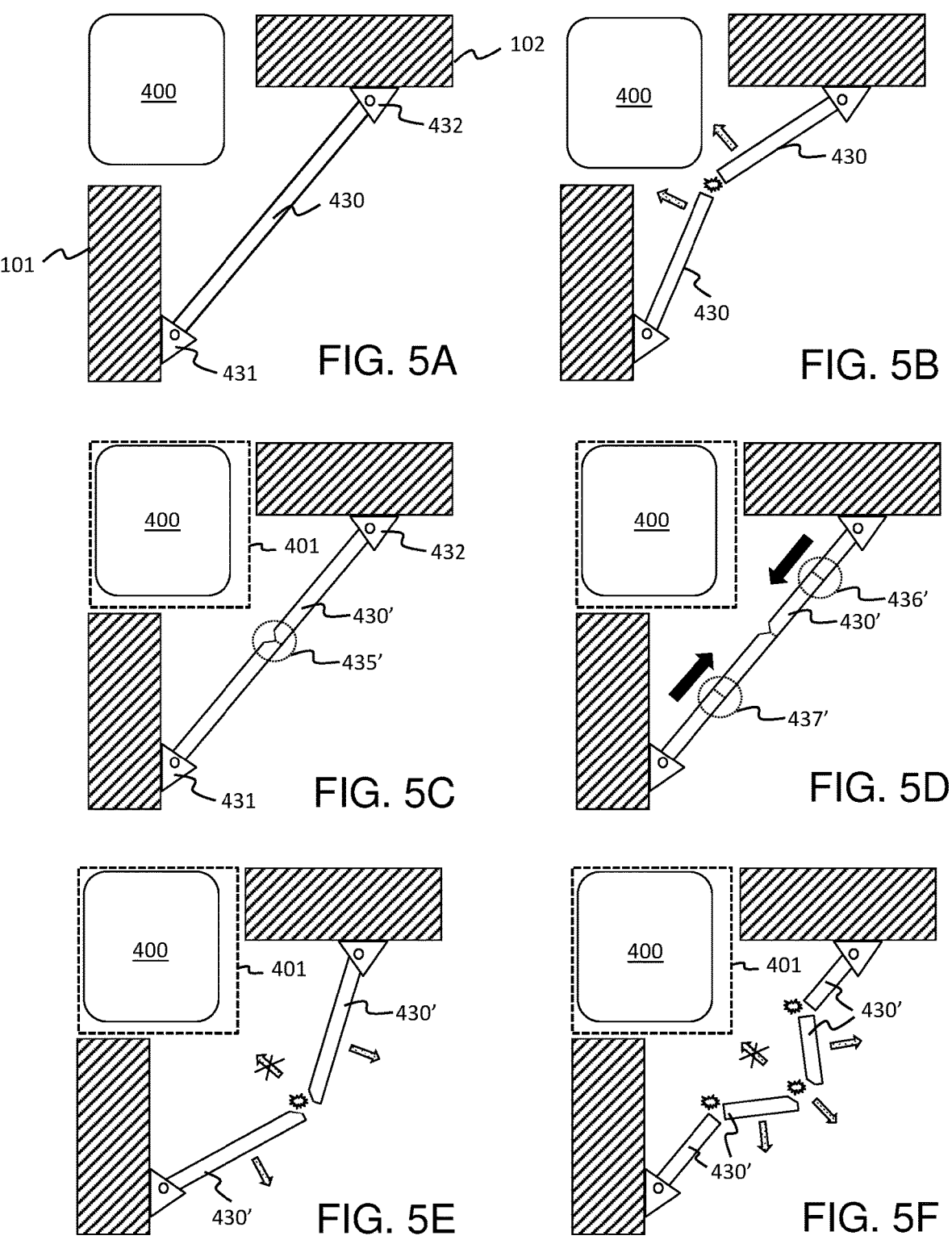
FIGS. 5A-5F are schematic illustrations of a 3D printed vehicle component according to some embodiments.

FIG. 5A-B shows one example of at least one first vehicle component in the form of a stay 430. The stay 430 is mounted via brackets 431, 432 on parts 101, 102 of the vehicle 100, 102, 104. In the vicinity of the mounted stay 430 is at least one second vehicle component 400. The second vehicle component 400 may e.g., be a gas tank or a coolant water reservoir mounted in an engine bay of a vehicle 100, 102, 104. In FIG. 5B, the stay 430 has experienced a mechanical failure and broken in half. In some cases, the failure of the mounted stay 430 may cause the mounted stay 430 to move in a direction towards the at least one second vehicle component 400. This may cause unwanted damage to the at least one second vehicle component 400, e.g., rupture a gas or coolant water tank.

Action 303. The processing unit 202 receives a request to form at least one first vehicle component 430, 430'. The request may possibly be received at a processing unit 202 and the request may be done by an automated control system or by user interaction. For instance, the request may be performed by a human operator working at a service centre or an aftermarket vehicle component supplier. The request may comprise a first 3D model of the at least one first vehicle component 430, 430' and/or a parts number for the at least one first vehicle component 430, 430'. The request may further be performed by a vehicle operator. In reference to FIGS. 5A-B, this may be performed upon detecting that the stay 430 has experienced a mechanical failure and broken in half, either automatically as described in Actions 301-302 or by manual inspection.

In other words, the request may originate from an automated service system analyzing sensor data from vehicle sensor 204 of the vehicle 100, 102, 104. Alternatively, the request may be done by a service technician reviewing sensor data from vehicle sensors 204, or by the vehicle operator. In one example, the vehicle operator is presented information regarding undesirable operation of the vehicle 100, 102, 104 as well as sensor data from vehicle sensors 204 as well as thresholds related to the sensor data. The vehicle operator may review the information and send the request. The request may also be done by the vehicle operator, selecting the vehicle component in a graphical user interface (GUI), after having manually reviewed the vehicle and tracked the source of the undesirable operation.

Action 304. After receiving the request in Action 303, the processing unit 202 obtains a 3D model for the at least one first vehicle component 430, 430'. The 3D model may, for example, be downloaded from a database of vehicle components and may be provided by the vehicle manufacturer, a vehicle component manufacturer, a service centre or an aftermarket component supplier. It may also be possible to download the 3D model of the at least one first vehicle component 430, 430' in the form of an original vehicle component from the database, using the parts number for the at least one first vehicle component 430, 430'. In addition, the database may comprise additional information regarding the vehicle component, such as vehicle part number, availability in a service centre, availability in a central storage facility, overall dimensions, structural data regarding operational and maximum loads the vehicle component may handle, materials the vehicle component is made of, materials the vehicle component may be 3D printed in, printing technologies the vehicle component may be 3D printed with, as well as required mechanical tolerances for the vehicle component. In addition, such information regarding the vehicle component may form part of the request to form the first vehicle component. Here, according to some embodiments, the 3D model may be dependent on a specified printing technique for the 3D printer 210. In some embodiments, the 3D model may be dependent on a predetermined movement scheme for the 3D printer 210.

Action 305. The processing unit 202 identifies at least one second vehicle component 400 located in proximity to the at least one first vehicle component 430, 430' when mounted on the vehicle 100, 102, 104. For example, in reference to the example shown in FIGS. 5A-B, this means that the processing unit 202 has identified the at least one second vehicle component 400 located in the vicinity of the mounted stay 430.

Action 306. After the identification in Action 305, the processing unit 202 may determine at least one breaking point 435', 436', 437' of the at least one first vehicle component 430, 430' which avoids the at least one first vehicle component 430, 430' to come into contact with the identified at least one second vehicle component 400 in case the at least one first vehicle component 430, 430' should break at the at least one breaking point 435', 436', 437'. This is exemplified below with reference to FIGS. 5C-5F.

FIG. 5C shows one example of at least one first vehicle component in the form of a 3D printed replacement stay 430'. The 3D printed replacement stay 430' is mounted via the brackets 431, 432 on the parts 101, 102 of the vehicle 100, 102, 104, thus replacing the original stay 430. In the vicinity of the mounted 3D printed replacement stay 430' is at least one second vehicle component 400. Also, 3D printed replacement stay 430' comprise a breaking point 435', i.e., a part of the 3D printed replacement stay 430' has been structurally weakened in order to force the 3D printed replacement stay 430' is a direction away from the at least one second vehicle component 400 in case of experiencing a mechanical failure and break. Optionally, as shown in FIG. 5D, the 3D printed replacement stay 430' may also comprise further breaking points 436', 437' in order to facilitate the desired movement of the 3D printed replacement stay 430' in case of failure. Furthermore, in FIG. 5D, it is also illustrated forces (in the form of fully drawn arrows) acting on the 3D printed replacement stay 430' which will cause it to mechanically fail and break, as shown in FIGS. 5E-5F.

According to some embodiments, the at least one breaking point 435', 436', 437' of the at least one first vehicle component 430, 430' is dependent on predefined physical boundaries 401 of the identified at least one second vehicle component 400 in a vicinity of an expected mounting position of the at least one first vehicle component 430, 430'. This is exemplified below with reference to FIGS. 5C-5F, as a boundary 401 that lies beyond the edge of the at least one second vehicle component 400. This may advantageously provide some extra precautionary space or safe zone upon failure of the 3D printed replacement stay 430'.

In some embodiments, the processing unit 202 may obtain characteristics of the identified at least one second vehicle component 400. For example, information regarding the surrounding vehicle components of the at least one first vehicle component 430, 430' when mounted on the vehicle 100, 102, 104 may be taken into consideration when determining the at least one breaking points 435', 436', 437' of the at least one first vehicle component 430, 430'. In FIGS. 5A-5F, this means that the characteristics of the at least one second vehicle component 400 may be obtained. In this case, the processing unit 202 may also, according to some embodiments, determine the at least one breaking point 435', 436', 437' based on the obtained characteristics. Hence, the obtained characteristics of the at least one second vehicle component 400 may be considered when determining the at least one breaking points 435', 436', 437' of the at least one first vehicle component 430, 430'. This may, for example, be used to determine the optimal direction that the at least one first vehicle component 430, 430' may move upon failure. Here, according to some embodiments, the characteristics of the identified at least one second vehicle component 400 may, in some embodiments, comprise one or more of: a physical robustness indication for the identified at least one second vehicle component 400, a replacement cost indication for the identified at least one second vehicle component 400, and a safety assessment indication for the identified at least one second vehicle component 400. In case a physical robustness indication for the identified at least one second vehicle component 400 is obtained, then this information may indicate how delicate or sensitive the identified at least one second vehicle component 400 are. Hence, the at least one breaking points 435', 436', 437' of the at least one first vehicle component 430, 430' may be determined so as to, for example, affect the least delicate or sensitive components(s) of the identified at least one second vehicle component 400 upon failure. Optionally, in case a replacement cost indication for the identified at least one second vehicle component 400 is obtained, then this information may indicate how costly the identified at least one second vehicle component

400 are, or how costly the identified at least one second vehicle component 400 are to replace. This may be in terms of time, money, etc. Hence, the at least one breaking points 435', 436', 437' of the at least one first vehicle component 430, 430' may be determined so as to, for example, affect the least costly or time-consuming replacement of components (s) of the identified at least one second vehicle component 400 upon failure. According to another option, in case a safety assessment indication for the identified at least one second vehicle component 400 is obtained, then this information may indicate how dangerous or serious it would be if the identified at least one second vehicle component 400 where to be damaged by the failure of the at least one first vehicle component 430, 430'. Hence, the at least one breaking points 435', 436', 437' of the at least one first vehicle component 430, 430' may be determined so as to, for example, affect the least dangerous of the components of the identified at least one second vehicle component 400 upon failure.

Action 307. After determining the at least one breaking points 435', 436', 437' in Action 306, the processing unit 202 may form a 3D model for the at least one first vehicle component 430, 430' based on the request and the determined at least one breaking point 435', 436', 437'. This means that, based on the request to form the at least one first vehicle component 430, 430' and the determined at least one breaking point 435', 436', 437', a 3D model may be formed for the at least one first vehicle component 430, 430'. The formed 3D model may, in some embodiments, be functionally the same as the original vehicle component but may be different in shape, weight and material. In one example, forming the 3D model takes into account the available 3D printing materials of 3D printer, and in particular the material properties of the 3D printing materials. The 3D model may be of any known computer-generated file format for representing a 3D model of a vehicle component. The processing unit 202 may connect to the 3D model database through the Internet or the 3D model database may be located locally to the processing unit. The 3D model may be of any common file format such as but not limited to STL, OBJ, FBX, COLLADA, 3DS, IGES; STEP, and VRML/X3D. The request to form the at least one first vehicle component 430, 430' may comprise structural, mechanical and material limitations for the 3D model that may be combined with 3D volume and size constraints forming part of the 3D model. This forming of the 3D model may further comprise several sub-steps (not shown) done iteratively in order to optimize the 3D model based on the request to form the at least one first vehicle component 430, 430' and the determined at least one breaking point 435', 436', 437'. The 3D model formed may comprise information necessary to print the 3D model on a 3D printer, as well as any necessary secondary manufacturing steps needed to complete the physical first vehicle component 301 based on the 3D model. The 3D model may be in the form of a print file ready to send to a 3D printer.

Action 308. After forming the 3D model in Action 307, the processing unit 202 may instruct a 3D printer 210 to print the 3D model. This means that, after forming the 3D model for the at least one first vehicle component 430, 430' in Action 307, the 3D printer 210 is instructed to print the 3D model. The 3D printer 210 may in some embodiments be located in a manufacturing facility specializing in 3D printing. Such a manufacturing facility may also be a conventional mechanical shop provided with 3D printing machines. In some embodiments, the 3D printer may be arranged locally, such as with the vehicle, or a dedicated mobile service vehicle. The instructions sent to the 3D printer may comprise data relating to each printing step for the 3D printer (layer by layer data) in a format readable by the 3D printer. Alternatively, the processing unit 202 may send the formed 3D model to the 3D printer and the 3D printer in turn converts the formed 3D model to machine instructions, or printing steps for printing the formed 3D model. Any 3D printing techniques may be used to print the common 3D model. 3D printing may also be referred to as additive manufacturing wherein material is added to an object being printed in a layer by layer manner, as opposed to subtractive manufacturing (milling, drilling, turning) wherein material is removed from a blank in order to form an object. In some case, the printed 3D model for the at least one first vehicle component 430, 430' may be referred to as a bridge part or structural bridge component since it may be used until an original spare part has been received. The instructions may be sent to a 3D printer from the processing unit 202 through a machine-to-machine interface.

To perform the method actions in an arrangement 200 for three-dimensional, 3D, printing of at least one first vehicle component for a vehicle 100, 102, 104, the arrangement 200 may comprise a processing unit 202 depicted in FIG. 4. FIG. 4 shows a schematic block diagram of embodiments of a processing unit 202. It should also be noted that, although not shown in FIG. 4, known conventional features of a processing unit 202, such as, for example, a power source, e.g., a battery or main connection, may be comprised in the processing unit 202.

The processing unit 202 may comprise processing circuitry 410 and a memory 420. The processing circuitry 610 may also comprise an input/output (I/O) module 411. The I/O module 411 may be arranged to transmit and/or receive signals from other components in the arrangement 200, such as, for example, the first communications unit 206, one or a plurality of sensors 204, a server comprising a database 212. It should also be noted that some or all of the functionality described in the embodiments above as being performed by the processing unit 202 may be provided by the processing circuitry 410 executing instructions stored on a computer-readable medium, such as, the memory 420 shown in FIG. 4. Alternative embodiments of the processing unit 202 may comprise additional components, such as, for example, an identifying module 412, a determining module 413, forming module 414, and an instructing module 415 responsible for providing its functionality to support the embodiments described herein.

The processing unit 202 or processing circuitry 410 is configured to, or may comprise the I/O module 411 configured to, receive a request to form at least one first vehicle component 430, 430', obtain a 3D model for the at least one vehicle component 430, 430'. Also, processing unit 202 or processing circuitry 410 is configured to, or may comprise the identifying module 412 configured to, identify at least one second vehicle component 400 located in proximity to the at least one first vehicle component 430, 430' when mounted on the vehicle 100, 102, 104. Further, the processing unit 202 or processing circuitry 410 is configured to, or may comprise the determining module 413 configured to, determine at least one breaking point 435', 436', 437' of the at least one first vehicle component 430, 430' which avoids the at least one first vehicle component 430, 430' to come into contact with the identified at least one second vehicle component 400 in case the at least one first vehicle component 430, 430' should break at the at least one breaking point 435', 436', 437'. Furthermore, the processing unit 202 or processing circuitry 410 is configured to, or may comprise the forming module 414 configured to, form a 3D model for the at least one vehicle component 430, 430' based on the request and the determined at least one breaking point 435', 436', 437'. Additionally, the processing unit 202 or processing circuitry 410 is configured to, or may comprise the instructing module 415 configured to, instruct a 3D printer 210 to print the 3D model.

In some embodiments, the at least one breaking point 435', 436', 437' of the at least one first vehicle component 430, 430' is dependent on predefined physical boundaries of the identified at least one second vehicle component 400 in a vicinity of an expected mounting position of the at least one first vehicle component 430, 430'. In some embodiments, the processing unit 202 or processing circuitry 410 may be configured to, or may comprise the I/O module 411 configured to, obtain characteristics of the identified at least one second vehicle component 400. In this case, according to some embodiments, the processing unit 202 or processing circuitry 410 may be configured to, or may comprise the determining module 413 configured to, determine the at least one breaking point 435', 436', 437' based on the obtained characteristics. According to some embodiments, the characteristics of the identified at least one second vehicle component 400 comprise one or more of: a physical robustness indication for the identified at least one second vehicle component 400, a replacement cost indication for the identified at least one second vehicle component 400, and a safety assessment indication for the identified at least one second vehicle component 400.

According to some embodiments, the processing unit 202 or processing circuitry 410 may be configured to, or may comprise the I/O module 411 configured to, receive an indication of an undesirable operation of the vehicle 100, 102, 104. In this case, according to some embodiments, the processing unit 202 or processing circuitry 410 may be configured to, or may comprise the identifying module 412 configured to, identify the at least one first vehicle component 430, 430' as relating to the undesirable operation of the vehicle 100, 102, 104. Here, in some embodiments, the indication is based on information received from sensors 204 comprised in the vehicle 100, 102, 104.

According to some embodiments, the 3D model is dependent on a specified printing technique for the 3D printer 210. In some embodiments, the 3D model is dependent on a predetermined movement scheme for the 3D printer 210.

Furthermore, the embodiments for three-dimensional, 3D, printing of at least one first vehicle component for a vehicle 100, 102, 104 described above may be at least partly implemented through one or more processors, such as, the processing circuitry 410 in the processing unit 202 depicted in FIG. 4, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 410 in the processing unit 202. The data carrier, or computer readable medium, may be one of an electronic signal, optical signal, radio signal or computer-readable storage medium. The computer program code may e.g., be provided as pure program code in the system 400 or on a server and downloaded to the processing unit 202. Thus, it should be noted that the processing unit 202 may in some embodiments be implemented as computer programs stored in memory 420 in FIG. 4, e.g., the computer readable storage unit/module, for execution by processors or processing modules, e.g., the processing circuitry 410 in the processing unit 202 in FIG. 4. By way of example, such computer readable medium or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable or computer readable medium. Thus, any such connection is properly termed a machine-readable or computer readable medium. Combinations of the above are also included within the scope of machine-readable or computer readable media. Machine or computer executable instructions may comprise, for example, instructions and data that cause a general-purpose computer, special purpose computer, or special purpose processing machines to perform a certain function or group of functions.

Those skilled in the art will also appreciate that the processing circuitry 410 and the memory 420 described above may refer to a combination of analog and digital circuits, and/or one or more processors configured with software and/or firmware, e.g. stored in a computer readable storage unit/module, that when executed by the one or more processors such as the processing circuitry 410 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

For reference, it should also be noted that the processing unit 202 may, for example, be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatuses, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. The embodiments herein are not limited to the above described preferred embodiments. Various alternatives, modifications and equivalents may be used. Therefore, the above embodiments should not be construed as limiting.

The invention claimed is:

1. A computer implemented method for three-dimensional printing of at least one first vehicle component for a vehicle, the method comprising:

receiving a request to form at least one first vehicle component;

obtaining a first 3D model for the at least one first vehicle component;

identifying at least one second vehicle component located in proximity to the at least one first vehicle component when mounted on the vehicle;

determining at least one breaking point of the at least one first vehicle component which avoids the at least one first vehicle component to come into contact with the identified at least one second vehicle component in case the at least one first vehicle component should break at the at least one breaking point, wherein the at least one breaking point of the at least one first vehicle component is dependent on a boundary that lies beyond an edge of the at least one second vehicle component in a vicinity of an expected mounting position of the at least one first vehicle component;

forming a second 3D model for the at least one first vehicle component based on the request and the determined at least one breaking point; and instructing a 3D printer to print the second 3D model.

2. The method according to claim 1, wherein determining at least one breaking point comprises:

obtaining characteristics of the identified at least one second vehicle component; and determining the at least one breaking point based on the obtained characteristics.

3. The method according to claim 2, wherein the characteristics of the identified at least one second vehicle component comprise one or more of:

a physical robustness indication for the identified at least one second vehicle component, a replacement cost indication for the identified at least one second vehicle component, and a safety assessment indication for the identified at least one second vehicle component.

4. The method according to claim 1, further comprising:

receiving an indication of an undesirable operation of the vehicle; and identifying the at least one vehicle component as relating to the undesirable operation of the vehicle.

5. The method according to claim 4, wherein the indication is based on information received from sensors comprised in the vehicle.

6. The method according to claim 1, wherein the second 3D model is dependent on a specified printing technique for the 3D printer.

7. The method according to claim 1, wherein the second 3D model is dependent on a predetermined movement scheme for the 3D printer.

8. A computer program product comprising a non-transitory storage medium comprising program code for performing the steps of claim 1 when said computer program product is run on a processing circuitry.

9. The computer program product according to claim 8, wherein the non-transitory storage medium comprises further program code, that when run on the processing circuitry, performs the steps comprising:

receiving an indication of an undesirable operation of the vehicle; and identifying the at least one vehicle component as relating to the undesirable operation of the vehicle.

10. An arrangement for three-dimensional (3D) printing of at least one first vehicle component for a vehicle, the arrangement comprising a 3D printer and processing circuitry, wherein the processing circuitry is configured to receive a request to form at least one first vehicle component;

obtain a first 3D model for the at least one vehicle component;

identify at least one second vehicle component located in proximity to the at least one first vehicle component when mounted on the vehicle;

determine at least one breaking point of the at least one first vehicle component which avoids the at least one first vehicle component to come into contact with the identified at least one second vehicle component in case the at least one first vehicle component should break at the at least one breaking point, wherein the at least one breaking point of the at least one first vehicle component is dependent on a boundary that lies beyond an edge of the at least one second vehicle component in a vicinity of an expected mounting position of the at least one first vehicle component;

form a second 3D model for the at least one vehicle component based on the request and the determined at least one breaking point; and instruct a 3D printer to print the second 3D model.

11. The arrangement according to claim 10, wherein the processing circuitry is further configured to obtain characteristics of the identified at least one second vehicle component and determine the at least one breaking point based on the obtained characteristics.

12. The arrangement according to claim 11, wherein the characteristics of the identified at least one second vehicle component comprise one or more of:

a physical robustness indication for the identified at least one second vehicle component, a replacement cost indication for the identified at least one second vehicle component, and a safety assessment indication for the identified at least one second vehicle component.

13. The arrangement according to claim 10, wherein the processing circuitry is further configured to receive an indication of an undesirable operation of the vehicle and identify the at least one first vehicle component as relating to the undesirable operation of the vehicle.

14. The arrangement according to claim 13, wherein the indication is based on information received from sensors comprised in the vehicle.

15. The arrangement according to claim 10, wherein the second 3D model is dependent on a specified printing technique for the 3D printer.

16. The arrangement according to claim 10, wherein the second 3D model is dependent on a predetermined movement scheme for the 3D printer.

17. A vehicle comprising an arrangement according to claim 10.

18. The vehicle according to claim 17, wherein the vehicle is marine vessel, a working machine, a truck or a bus.

* * * * *